P. THOMAS.
ELECTRICAL MEASURING INSTRUMENT.
APPLICATION FILED DEC. 4, 1913.

1,164,032.

Patented Dec. 14, 1915.

WITNESSES:
Fred A. Lind.
J. H. Procter

INVENTOR
Phillips Thomas
BY
Wesley G. Carr
ATTORNEY

UNITED STATES PATENT OFFICE.

PHILLIPS THOMAS, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,164,032.     Specification of Letters Patent.     Patented Dec. 14, 1915.

Application filed December 4, 1913. Serial No. 804,756.

*To all whom it may concern:*

Be it known that I, PHILLIPS THOMAS, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to potentiometers.

The object of my invention is to provide a device to be used in connection with a potentiometer to increase the range of measurement of the same without impairing its accuracy.

Heretofore, various devices have been proposed for extending the range of measurement of a potentiometer, but the accuracy of the instruments using the same is lowered thereby, by reason of the fact that the same scale is used to represent a greater value, which decreases the size of the divisions per millivolt drop and increases the percentage of error.

My present invention is adapted to accomplish the desired result and to avoid the above mentioned objectionable characteristics.

Figure 1:
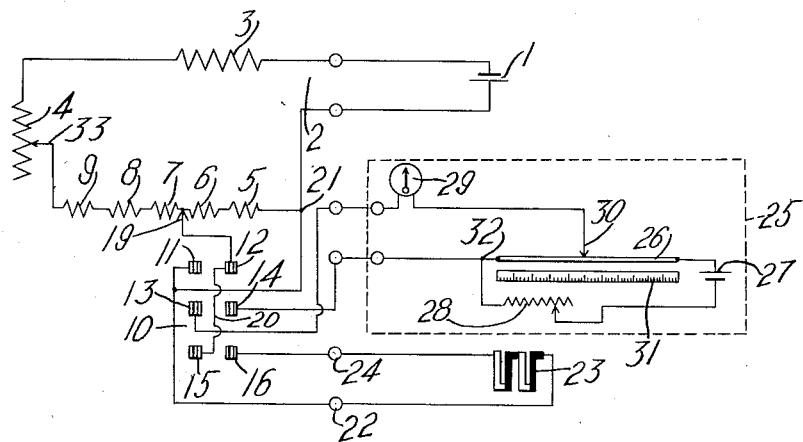
Figure 2:
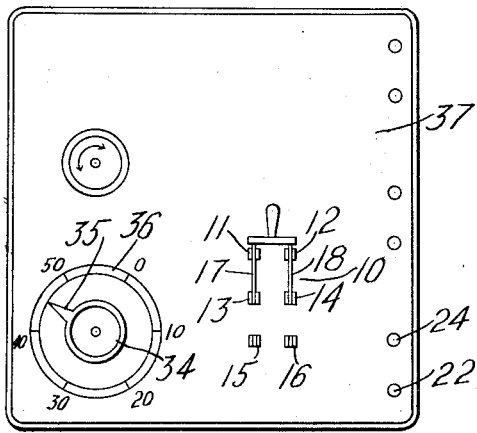

Figure 1 of the accompanying drawings is a diagrammatic view of circuits and instruments embodied in my invention and Fig. 2 is a top plan view of a range-extending device embodying my invention.

Referring to the accompanying drawings, my invention comprises, in detail, a source of electromotive force 1 which is connected to a circuit 2 comprising a resistor 3 of a relatively high resistance, an adjustable resistor 4 and a plurality of resistors 5, 6, 7, 8 and 9 having substantially equal resistances. A double-pole, double-throw knife blade switch 10 is also provided, which comprises a plurality of terminal contact members 11, 12, 13, 14, 15 and 16, and two knife blade members 17 and 18 suitably connected together at one end by an operating handle and pivotally mounted at the other end on the terminal members 13 and 14, respectively. A movable contact member 19 is provided for engaging the connecting conductors between the resistors 5, 6, 7, 8 and 9 and it is electrically connected to the terminal member 12. The terminal member 12 is also electrically connected to the terminal member 15 by a conductor 20. The terminal member 11 is electrically connected to a point 21 of the circuit 2 and to one terminal 22 of a source of electromotive force or thermo-couple 23 the voltage of which is to be measured. The other terminal 24 of the thermo-couple 23 is electrically connected to the terminal member 16 of the switch 10, and the terminal members 13 and 14 are respectively connected to the terminals of any well known form of potentiometer 25.

The potentiometer 25 comprises an adjustable resistor 26, a battery 27, a second adjustable resistor 28, all connected in closed circuit relation, and a galvanometer 29, one terminal of which is electrically connected to the terminal member 13 of the switch 10 and the other terminal of which is connected to a movable contact member 30 for engaging the resistor 26 which is provided with a scale 31 for indicating in connection with a pointer on the contact member 30, the reading of the same. The point 32 of the resistor 26 is electrically connected to the contact terminal member 14 of the switch 10, substantially as shown in the drawings.

The adjustable resistor 4 is provided with a movable contact member 33 for reasons hereinafter set forth. The resistors 5, 6, 7, 8 and 9 may be arranged in a circle, and the movable contact member 19 may be provided with a handle 34 and an indicator 35 for coöperating with a scale 36 to show the correction factor to be added to the potentiometer reading to get the correct reading of the same. The resistors 3, 4, 5, 6, 7, 8 and 9 and the switch 10 are mounted in a box 37 which is provided with the necessary terminal members for the proper connection of the same to the apparatus hereinbefore mentioned.

Assuming that the slidewire or adjustable resistor 26 of the potentiometer 25 is of such resistance, and that the potential drop across the resistor is approximately 10 millivolts, and assuming that the coils 5, 6, 7, 8 and 9 are severally so proportioned that the potential drop across each of the same is approximately 10 millivolts, if the electromotive force of the thermo-couple or other source of electromotive force to be measured is not larger in value than 10 millivolts, the switch 10 is thrown so that the knife blades 17 and 18 connect the contact terminals 13 and 15, and 14 and 16, respectively, and the indicator 35 is set to the zero position on the scales 6. The operation of balancing the potentiometer, which is well known to those versed in the art, is performed, and the drop in potential is read directly from the scale 31. However, should the voltage of the thermo-couple to be measured lie between 10 and 20 millivolts, my invention is further utilized and the operation is as follows:

The contact member 30 is set on the 10 millivolt division of the scale 31 and the switch 10 is thrown to such a position that the blades 17 and 18 connect the contact terminal 11 and 13, and 12 and 14, respectively. The handle 34 is rotated until the contact member 19 engages the circuit 2 intermediate the resistors 5 and 6, and the indicator 35 coincides with the division 10 on the scale 36. Then the resistor 4 is adjusted by moving the contact member 33 until the galvanometer is balanced showing that there is 10 millivolts drop in voltage across the points of contact terminals 11 and 12, which voltage is of a sign that is opposite to the sign of the voltage impressed across the contact terminals 15 and 16 which is to be measured. Thus, if the switch 10 is thrown so that the blades 17 and 18 connect contact terminals 13 and 15, and 14 and 16, respectively, the drop in voltage across the contact terminals 13 and 14 is the difference between the value of the voltage to be measured and 10 millivolts. Hence, this voltage is measured by the potentiometer in a manner familiar to those versed in the art. The real value of the voltage of a thermo-couple or other source of electromotive force to be measured is equal to the potentiometer reading, which is usually less than 10 millivolts, plus 10 millivolts or the reading of the scale 36.

If the value of the voltage to be measured be larger than 20 millivolts, the movable contact member 19 will be moved to such point that the indicator 35 will indicate the proper value of the voltage to be added to 10 millivolts or less to equal the correct value of the voltage drop across the source of electromotive force to be measured. The switch 10 may be retained in such a position that its blades 17 and 18 connect the contact terminals 13 and 15, and 14 and 16, respectively. Then, as hereinbefore described, the potentiometer is adjusted, and the value of the difference between the true value of the voltage to be measured and the value as indicated by the indicator 35 is read.

One advantage of my invention is that the value of each division on the scale 36 always remains the same. Another advantage is apparent by reason of the fact that the voltage to be measured is opposed by a known exact voltage, and, since the voltage drops across each of the resistors 5, 6, 7, 8 and 9 are equal in value, it is only required that my device be set for one reading to retain its accuracy for each of the several resistors, so long as the electromotive force of the battery 1 remains constant, and so long as the coefficient of resistance of the resistors 3, 4, 5, 6, 7, 8 and 9 is substantially zero.

While I have described herein circuits and apparatus embodying my invention, I desire it to be understood that such changes may be made as do not depart from the spirit and the scope of the same, as set forth in the appended claims.

I claim as my invention:

1. In an electrical measuring instrument, the combination with means for measuring the value of the potential of a source of electromotive force, of means for opposing the voltage of the source of electromotive force to be measured by an electromotive force of a value which, if subtracted from the value of the electromotive force to be measured, the remainder will be of a value that may be accurately measured by the said means for measuring the value of the potential.

2. A method of measuring the value of an electromotive force which consists in first opposing the electromotive force to be measured by a known value of electromotive force, then measuring the resulting electromotive force and then adding the known value of the opposing electromotive force to the value of the measured electromotive force to obtain the total value of the electromotive force to be measured.

3. A method of measuring the value of an electromotive force which consists in first opposing the electromotive force to be measured by a known value of electromotive force, then measuring the resulting small value of electromotive force, and then adding the known value of the opposing electromotive force to the measured small value of electromotive force to obtain the total value of the electromotive force to be measured.

4. In an electrical measuring instrument, the combination with means for measuring relatively small values of electromotive force, of a source of electromotive force of known value, a plurality of resistors connected in series relation thereto, and means for opposing the electromotive force to be measured by the electromotive force of known value.

5. In a potential measuring instrument, the combination with a potentiometer, of a source of electromotive force of known value, a plurality of resistors connected in circuit with the said source of electromotive force, and means for opposing the electromotive force to be measured by the electromotive force of known value impressed across the said resistors.

6. In a measuring instrument for measuring relatively high potentials, the combination with a potentiometer, of a source of electromotive force of known value, a plurality of resistors connected to the said source of electromotive force, and means for so connecting the potentiometer to the resistors that the electromotive force to be measured is opposed by the electromotive force impressed across the said resistors.

7. In an instrument for measuring potential, the combination with a potentiometer, of a device comprising a source of electromotive force of known value and a plurality of resistors connected in series relation to the said source of electromotive force, and means for opposing the electromotive force to be measured by the electromotive force impressed across the resistors and for so connecting the said potentiometer to the said device that the resulting electromotive force incident to opposing the electromotive forces may be measured.

8. A measuring device comprising a source of electromotive force of known value, means for measuring relatively small values of potential and means for so opposing the source of electromotive force of known value by a source of electromotive force to be measured that the resultant electromotive force may be measured by the said means for measuring relatively small values of potential.

9. A measuring device comprising a source of electromotive force of known value, a potentiometer and means for so opposing the electromotive force of known value by the electromotive force to be measured that the resultant may be measured by the potentiometer.

In testimony whereof, I have hereunto subscribed my name this 28th day of Nov., 1913.

PHILLIPS THOMAS.

Witnesses:
B. B. Hines,
M. C. Merz.